June 7, 1960 C. H. MAPES ET AL 2,939,225
GLOBE STAND
Filed April 4, 1957 2 Sheets-Sheet 1
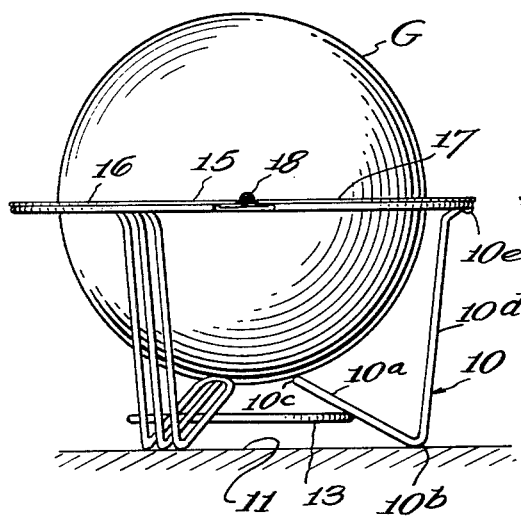
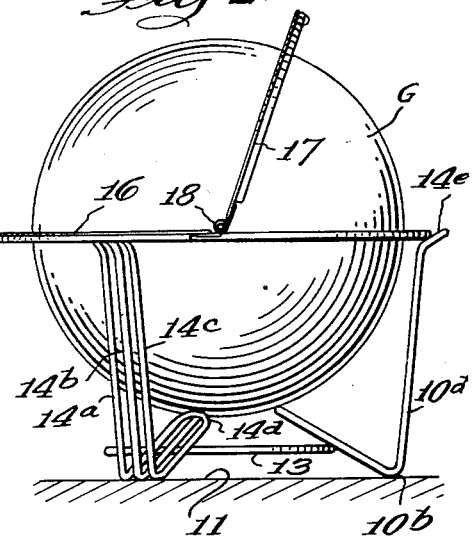
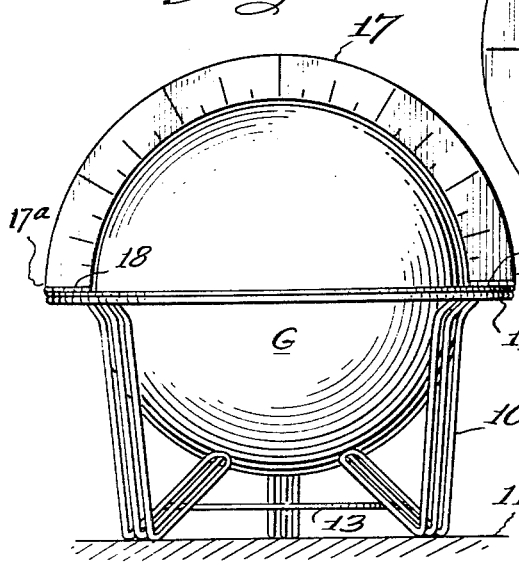
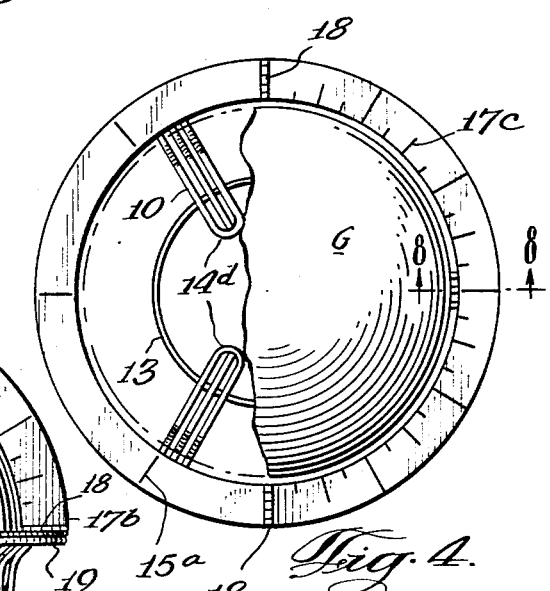
INVENTORS.
Carl H. Mapes
Richard M. Carrigan
By Schroeder, Hofgren, Brady & Wegner
Attorneys June 7, 1960  C. H. MAPES ET AL  2,939,225
GLOBE STAND
Filed April 4, 1957  2 Sheets-Sheet 2
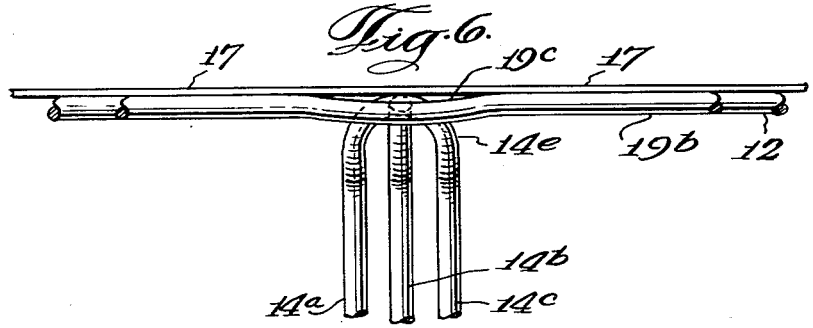
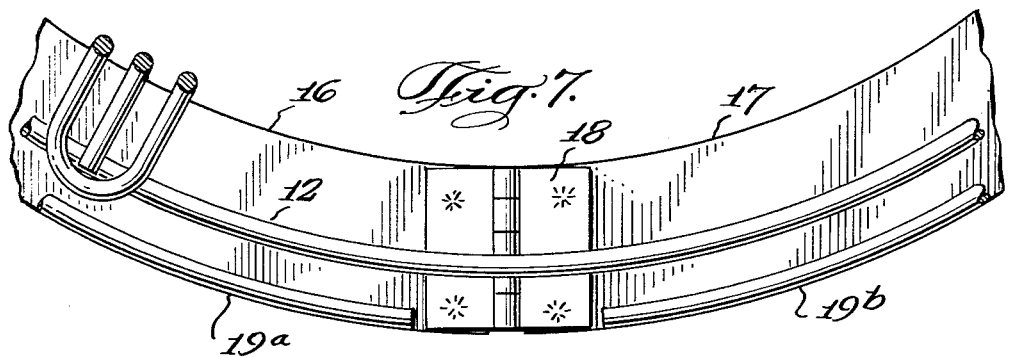
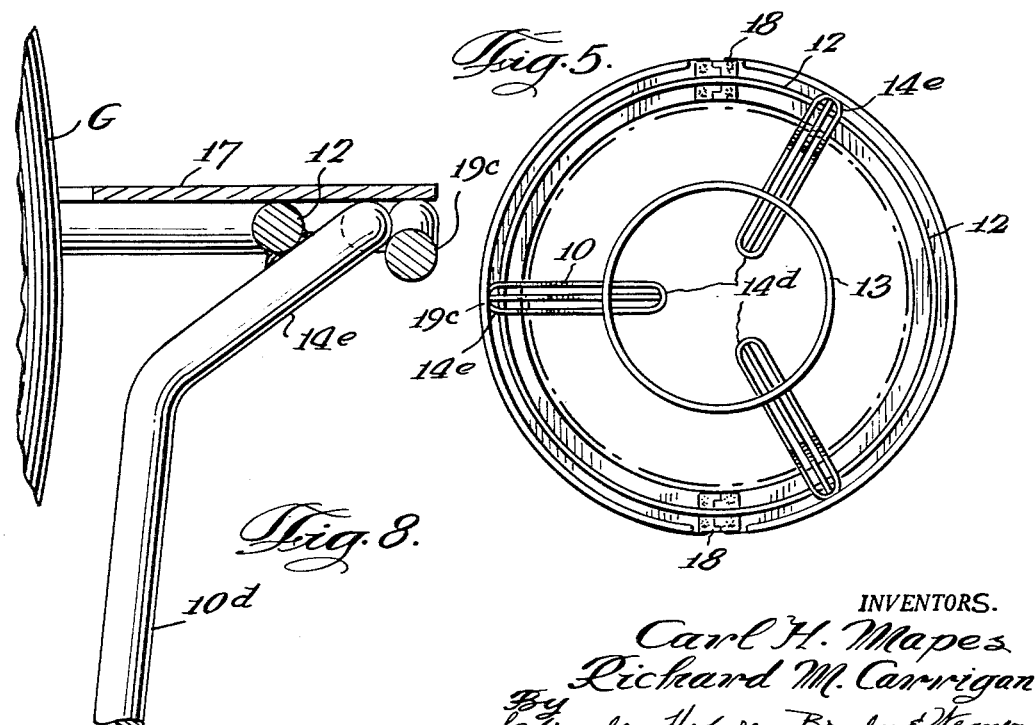
INVENTORS.
Carl H. Mapes
Richard M. Carrigan
By Strader, Hofgren, Brady & Wegner
attorneys United States Patent Office 2,939,225
Patented June 7, 1960

2,939,225

GLOBE STAND

Carl H. Mapes, Evanston, and Richard M. Carrigan, Skokie, Ill., assignors to Rand McNally & Company, a corporation of Illinois Filed Apr. 4, 1957, Ser. No. 650,684

4 Claims. (Cl. 35—46)

This invention relates to a globe mounting and in particular to a globe stand having integral scale means.

The presently known globe stands, for use with globes such as terrestrial or celestial globes, have been found to have certain disadvantages. One such disadvantage is that they are relatively costly due to the necessary accurate tolerances of their globe supporting surfaces. Another disadvantage is their failure to provide certain desirable scale means for use in making desirable measurements of globular distances and angular relationships.

The principal feature of this invention is the provision of a new and improved globe stand arranged to support a globe on a plurality of points to permit universal movement thereof.

Another feature is that three such supporting points are provided, which points are spatially correlated with a horizon ring means to dispose the horizon ring around the midportion of the globe.

A further feature is the provision in such a globe stand of a horizon ring comprising a first, horizontally fixed arcuate element and a second arcuate element movably associated with the first element to serve alternatively as a portion of the horizon ring and as a movable scale element.

Still another feature of the invention is the provision of such a globe support having means for locking releasably the movable element in horizontal alignment with the fixed element.

Other features and advantages of this invention will be apparent from the following description taken in connection with the accompanying drawings wherein:

Fig. 1 is a side elevation of a globe stand embodying the invention, with a globe mounted thereon and with the movable element of the horizon ring in one position;

Fig. 2 is a side elevation similar to that of Fig. 1 but with the movable element in another position;

Fig. 3 is a front elevation thereof, with the movable element in a vertical position;

Fig. 4 is a top plan view thereof, with a portion of the globe broken away and with the movable element in the horizontal position;

Fig. 5 is a bottom plan view thereof;

Fig. 6 is an enlarged, fragmentary elevational view showing details of the ring locking means;

Fig. 7 is an enlarged, fragmentary bottom plan view showing details of the hinge structure; and Fig. 8 is a vertical section taken approximately along the line 8—8 of Fig. 4.

In the exemplary embodiment of the invention as disclosed in the drawings, the globe stand is shown to comprise a support extending between three planes, namely a bottom plane upwardly from which a first portion of the support extends to terminate in an intermediate plane defined by a plurality of globe supporting points, and upwardly from which bottom plane a second portion extends to terminate in an upper plane in which is arranged a globe encircling horizon ring means. The present invention further comprehends the provision of an articulated horizon ring structure wherein a portion thereof is movable to serve as a scale means for measuring distances and angular relationships on the globe supported on the stand.

More specifically, the globe stand comprises a plurality of generally V-shaped leg elements 10 each having a short leg 10a extending, at a relatively small angle to the horizontal, from a lower apex 10b of the leg element to terminate in a globe supporting point 10c. Preferably three such leg elements are provided to form a tripartite globe support with each of the points 10c lying in a plane spaced somewhat above the horizontal plane through the apices 10b of the leg elements. As illustrated, the plane of the apices may comprise the surface of a supporting means such as a table 11.

Extending, at a small angle to the vertical, upwardly from apex 10b of each leg element is a second, long leg 10d. The upper ends 10e of the leg elements are splayed slightly and terminate in a common horizontal plane spaced substantially above the plane of points 10c. Secured to the upper ends 10e is a ring 12 for fixing the leg elements substantially 120° to each other. The short legs 10a may be secured to a complementary small ring 13 for securing the lower portion of the leg elements similarly in the 120° angular relationship.

Each of leg elements 10 preferably comprises a plurality of generally parallel rod members and in the illustrated embodiment comprises three such members 14a, 14b and 14c. The laterally outer rod members, illustratively members 14a and 14c, are preferably continuous with a common rounded end portion 14d which defines point 10c of the leg element, and an opposite, rounded end portion 14e which defines the upper end 10e of the leg element. Middle rod member 14e may be secured to the outer rod members at the end portions by suitable means such as welding or brazing, depending on the type of material of which the rod members are constructed.

As discussed above upper ring 12 is arranged in a horizontal plane and is of a substantially large diameter relative to the spacing between points 10c. In addition to retaining the upper leg portions 10d in fixed relationship to each other, ring 12 serves to carry a horizon ring or band generally designated 15. The plane of the horizon ring, as determined by the disposition of upper ends 10e of the leg elements, is related to the plane of points 10c, and the internal diameter of the horizon ring is correlated with said points, so that the horizon ring encircles the midportion of a globe G resting on points 10c to extend semispherically between leg portions 10a and having a diameter just slightly smaller than the internal diameter of the horizon ring. Suitable scale markings or indicia 15a may be placed on the upper surface of the horizon ring, such as mileage markings where the globe is of the terrestrial type.

As discussed briefly above, the horizon ring of the present invention is preferably articulated so that a portion thereof may also serve as a scale device disposable in any one of a plurality of planes at different angles to the horizontal plane. For this purpose, horizon ring 15 may comprise complementary semi-circular ring elements 16 and 17. One ring element, as ring element 16, is fixedly secured to ring 12 and forms a permanently arranged horizontal portion of the horizon ring.

Ring element 17 may be pivotally secured by a suitable pivot or hinge structure 18 at its ends 17a and 17b to complementary ends of fixed element 16. Thus, movable element 17 may pivot from a horizontal position, such as seen in Fig. 1, upwardly to a vertical position such as seen in Fig. 3, and to such intermediate positions or positions beyond the vertical position as desired. As ring element 17 is thus usable for different measurement determinations from those suitable with a simple horizon ring, additional scale markings or indicia 17c may be provided thereon, as desired.

In the illustrated embodiment, horizon ring 15 comprises a flat band, and to reinforce the band a reinforcing ring 19 is provided comprising a first, semi-circular portion 19a fixedly secured to the underside of fixed element 16. A generally similar, semi-circular portion 19b is fixedly secured to the underside of the movable ring element 17 for reinforcing that element. At its midpoint, semi-circular portion 19b is formed into a snap-lock means 19c by being bent downwardly away from the band. Thus, the lock means 19c may be snapped over the end portion 14e of an adjacent leg element to lock releasably the movable element 17 in the horizontal plane, and thus in alignment with the fixed ring element 16, to form a complete 360° horizon ring.

In using the globe stand of the present invention, it should be noted that the globe G is supported for universal movement on the three points 10c and thus may be disposed in any position on the stand so that all positions of the globe may be presented upwardly as desired. Because of the point contact with the globe, the stand offers minimal resistance to turning, and by virtue of the rounded characteristics of the end portions 14d deformation of the globe surface is substantially eliminated. The three-point suspension of the globe offers improved accuracy in the position of the globe relative to the horizon ring as compared to the four-point suspension, as is common in the art, where each of the four elements must be accurately positioned to insure proper surface contact with the globe.

Where the globe is to be used in the conventional manner for general reference purposes, both portions of the horizon ring may be maintained in the horizontal plane. However because of the releasable lock means the movable portion may be readily swung upwardly as desired for use as an improved measuring means. As the hinge structures 18 are disposed at the ends of the ring portions they may be used in establishing reference points on the globe from which reference points the desired measurements may be made.

Because of the novel construction of the globe stand, it is simple and economical of manufacture while yet it provides measuring means heretofore provided only in substantially more complicated and expensive globe supports.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A globe stand, comprising: means for supporting a globe; a ring fixed to said supporting means to encircle the globe in a horizontal plane slightly below a horizontal diametric plane of the globe; and indicator means associated with the first-named means to indicate a great-circle of the globe and including a first 180° portion fixed to said ring to encircle one-half of the globe in the horizontal diametric plane and a second 180° portion pivotally associated at its ends with the first portion to encircle any one of a plurality of one-half portions of the globe including the one-half globe portion complementary to the one-half globe portion being encircled by said first 180° indicator means portion, said ring being arranged to position said second 180° indicator means portion to encircle said complementary globe portion when said second 180° indicator means portion is pivoted into engagement therewith.

2. In a mounting for a globe, a ring adapted to encircle a globe; a support associated with said ring to carry the globe and maintain the ring spaced from a plane parallel to the circumferential plane thereof thereby to accommodate a semispherical portion of the globe between said planes; a semi-circular horizon ring element fixed on said ring to encircle a portion of the globe in a horizontal diametric plane thereof; and a semi-circular indicator element pivotally associated at its ends with said ring to encircle any one of a plurality of portions of the globe alternatively to extend complementarily to said horizon ring element in said horizontal diametric plane for forming with said horizon ring element a complete horizon ring annulus when said indicator element is pivoted into engagement with said ring and to extend angularly to said horizon ring element to form individually an adjustably positionable scale.

3. A mounting for a globe, comprising: a support for removably carrying a globe, a ring secured to said support adapted to encircle the mid-portion of the globe; a first arcuate indicator fixed on said ring to encircle a semi-spherical portion of the globe; and a second arcuate indicator pivotally associated at its ends with said ring and the ends of the first indicator to encircle any one of a plurality of semi-spherical portions of the globe and define, when desired, a great circle of said globe; a reinforcing ring secured to the second indicator; and means for locking releasably the second indicator in planar alignment with the first indicator comprising a portion of the ring on the second indicator arranged to snap over a portion of said support.

4. A mounting for a globe, comprising: a tripartite support having three V-shaped legs each terminating in a first end portion arranged to carry removably a globe resting thereon and each terminating in a second end portion arranged in a horizontal plane through the center of the globe; an annular element encircling the globe in said plane and secured to said second end portions; a semi-circular horizon ring portion fixedly secured to said element to encircle one-half of the globe in said plane; a semi-circular scale ring portion pivotally movable about the ends of the horizon ring portion to encircle one half of the globe in said horizontal plane and in any one of a plurality of planes extending angularly to the horizontal plane and through the ends of the horizon ring portion; and a snap on the scale ring portion for connection with a second end portion of one of the legs to lock releasably the scale ring portion in the horizontal plane to define with the semi-circular horizon ring portion a full circular horizon ring.

References Cited in the file of this patent

UNITED STATES PATENTS

| 253,508 | Cheney | Feb. 14, 1882 |
| 2,151,601 | Johnson | Mar. 21, 1939 |

FOREIGN PATENTS

| 808,938 | France | Nov. 24, 1936 |
| 1,004,206 | France | Nov. 28, 1951 |
| 253,974 | Switzerland | Dec. 1, 1948 |